United States Patent [19]

Harlan

[11] 4,337,478

[45] Jun. 29, 1982

[54] COMPOSITE TIMING SIGNAL GENERATOR WITH PREDICTABLE OUTPUT LEVEL

[75] Inventor: Wayne E. Harlan, Indianapolis, Ind.

[73] Assignee: RCA Corporation, New York, N.Y.

[21] Appl. No.: 210,840

[22] Filed: Nov. 26, 1980

[51] Int. Cl.[3] .............................................. H04N 9/46
[52] U.S. Cl. ................................... 358/20; 358/21 R; 358/160
[58] Field of Search ....................... 358/17, 19, 20, 21, 358/160, 148, 150, 176, 178

[56] References Cited

U.S. PATENT DOCUMENTS

4,263,610  4/1981  Shanley et al. ........................ 358/20
4,295,163  10/1981  Hettiger ............................. 358/20 X

*Primary Examiner*—Robert L. Richardson
*Attorney, Agent, or Firm*—Eugene M. Whitacre; Paul J. Rasmussen; Ronald H. Kurdyla

[57] ABSTRACT

A circuit for generating a composite timing signal in a television receiver comprises a gate pulse generating circuit, and a voltage divider coupled across a fixed voltage source. The composite signal comprises a first pulse developed at an output of the voltage divider during television signal horizontal and vertical blanking intervals, and a second pulse developed by the gate pulse circuit during a portion of the horizontal and vertical blanking intervals and superimposed on the first pulse. A switching device coupled to the voltage divider responds to horizontal and vertical timing control signals applied via signal coupling circuits for enabling the voltage divider to develop the first pulse. The level of the first pulse is predictably determined by the voltage divider substantially independent of the amplitudes of the horizontal and vertical timing signals, and the values of circuit components included in the timing control signal coupling circuits.

9 Claims, 3 Drawing Figures

COMPOSITE TIMING SIGNAL GENERATOR WITH PREDICTABLE OUTPUT LEVEL

This invention concerns a circuit for developing a composite timing signal from which multiple keying signals can be derived, for use in a television receiver including keyed circuits. In particular, the invention concerns such a circuit wherein a keying level generated during video signal blanking intervals exhibits significantly reduced sensitivity to tolerance related variations in the values of circuit elements and signals associated with the timing signal generator circuit.

In a color television receiver for processing a composite color television signal including luminance, chrominance and synchronizing signal components, there is a need for signal processing functions that require keying or synchronization with respect to the composite television signal. These functions can include keying to separate the burst and chrominance information components of the composite signal, keying a blanking level clamp during image blanking intervals to establish a black reference level for a displayed picture, and keying during horizontal and vertical retrace blanking intervals to inhibit image display during these intervals.

When keyed luminance or chrominance signal processing circuits of the receiver are contained within an integrated circuit in whole or in significant part, it is desirable to provide a single, composite timing signal from which signals for performing the decreased keying functions can be derived. A single, composite timing signal of this type is desirable since only a single external keying signal input terminal of the integrated circuit is then required. Also, an integrated circuit incorporating a composite timing signal generator requires only one output terminal for providing the composite timing signal.

Such a composite timing signal is known, and is often referred to as a "sandcastle" signal because of its configuration. The sandcastle timing signal typically comprises a first blanking pulse component of a given width, and a second keying pulse component of lesser width superimposed on the first pulse component. The first and second pulse components exhibit given amplitudes and timing in accordance with the keying and synchronizing requirements of signal processing circuits within the receiver.

In accordance with the principles of the present invention, it is herein recognized as being desirable to establish a predictable level of the first (blanking) pulse component of the composite timing signal. A predictable blanking pulse level serves to assure reliably timed blanking of circuits responsive to the first component, and also promotes reliable keying of circuits which respond to the second, keying pulse component which is superimposed on the blanking pulse component.

Timing signal generator apparatus according to the present invention is included in a television receiver for processing a composite television signal including image and blanking intervals. The receiver includes keyed signal processing circuits, and a source of a plurality of image blanking signals each with a blanking pulse component occurring during image blanking intervals, the plurality of signals including horizontal and vertical blanking signals. The timing signal generator develops a timing signal during blanking intervals, and comprises a resistive impedance voltage divider, a controlled switching network, and a coupling network. The voltage divider is coupled across a source of D.C. potential during the television signal image and blanking intervals, and includes an output terminal coupled to the keyed signal processing circuits. The voltage divider is arranged for producing a voltage divider version of the D.C. potential corresponding to a desired blanking voltage level. The switching network is coupled to the voltage divider and is operable between first and second conductive states. The coupling network couples the plurality of blanking signals to the switching network for causing the switching network to exhibit the first conductive state for decoupling the coupling network from the voltage divider in response to the blanking pulse components, so that the voltage divider is then permitted to produce the desired blanking voltage level at the output terminal. The switching network is caused to exhibit the second conductive state in the absence of the pulse components, so that a voltage level different than the desired blanking level is produced at the output terminal.

In accordance with a feature of the invention, the voltage divider network comprises a passive circuit consisting of a plurality of resistors coupled across the source of D.C. potential.

Figure 1:
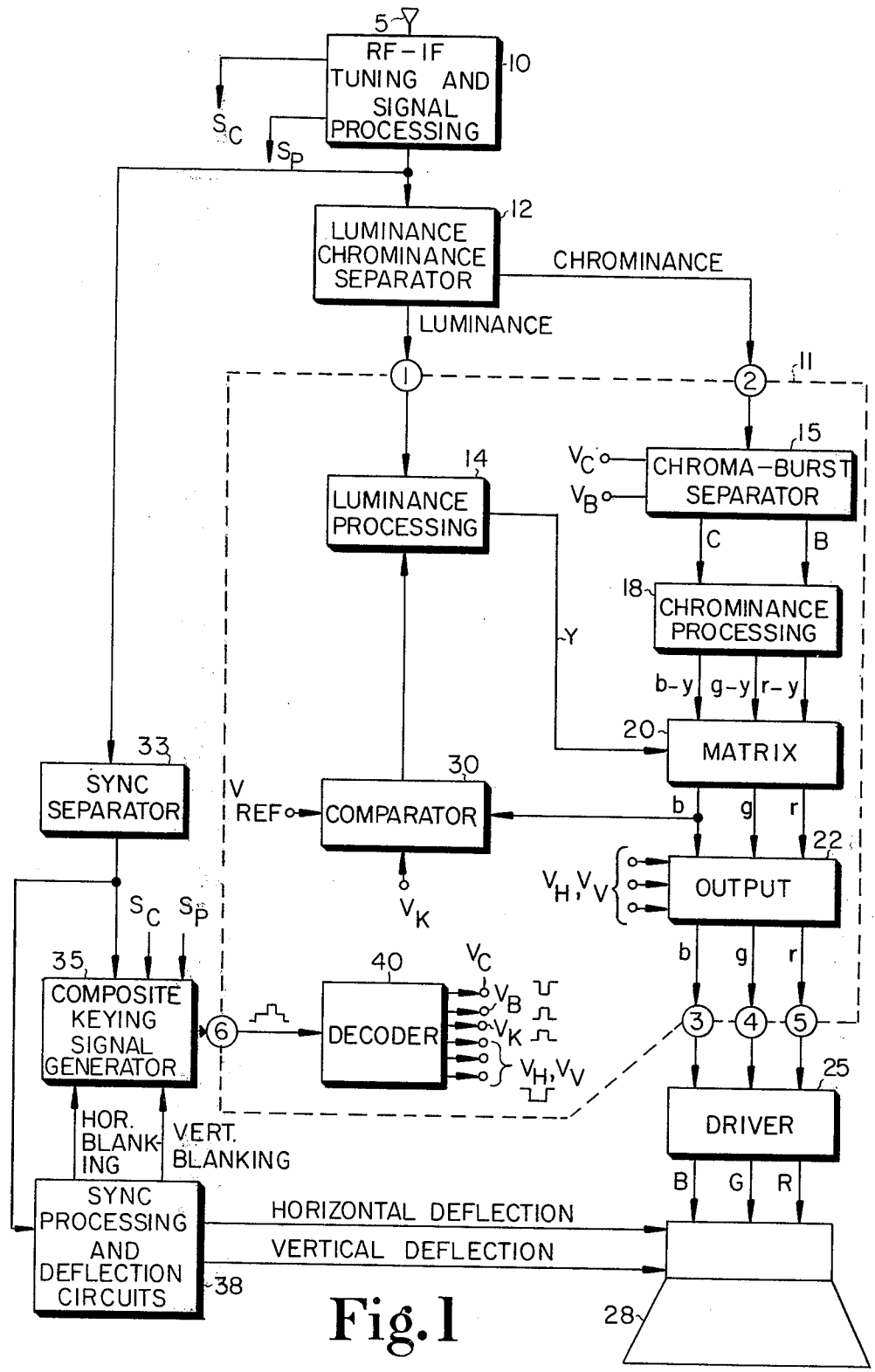
FIG. 1 shows a block diagram of a system including a color television receiver comprising apparatus according to the present invention.

In FIG. 1, color television signals received by an antenna 5 are applied to a radio frequency (RF) and intermediate frequency (IF) tuning and signal processing unit 10, including RF and IF amplifier and video detector stages. The tuning portion of unit 10 includes a frequency selective channel selector (tuner) mechanism, and a tuner control network. The tuner control network provides an output channel change blanking control signal $S_c$ when the receiver is being tuned from channel to channel, and also provides an output picture interval blanking control signal Sp, as will be discussed. Signal processing unit 10 supplies detected video signals to a luminance-chrominance signal separator 12. Separator 12 (e.g., a comb filter) separates the luminance and chrominance components of the composite television signal, and supplies these separated components to respective input terminals 1 and 2 of a luminance and chrominance signal processing network 11.

The separated luminance component is processed by a luminance signal processing unit 14 in a luminance channel of the receiver. The separated chrominance component is supplied to a keyed chrominance-burst separator 15, which provides separated burst information (B) and chrominance picture interval information (C). Signal separator 15 can be of the type described in U.S. Pat. No. 4,038,681 of L. A. Harwood. The separated signals are then supplied to a chrominance signal processing unit 18 for developing r-y, g-y and b-y color difference signals as known. The color difference signals are combined in a signal matrix 20 with an amplified luminance output signal (Y) from unit 14, for developing output r, b and g color image signals.

The luminance channel includes a blanking level clamp comprising a keyed comparator 30 which is keyed during the burst interval of each video signal horizontal blanking interval. When keyed, comparator 30 samples and compares a brightness reference voltage $V_{REF}$ with the D.C. level of the signal then appearing at the b (blue) signal output of matrix 20. An output signal from comparator 30 is supplied to a control input of luminance processor 14, for establishing the blanking level of the luminance signal (and thereby picture brightness) at a correct level in accordance with the level of voltage $V_{REF}$. The arrangement of comparator 30 with luminance processor 14 and matrix 20 is described in detail in U.S. Pat No. 4,197,557 of A. V. Tuma, et al.

The r, g, b color signals from matrix 20 are separately coupled via plural output networks included in an output unit 22, to output terminals 3, 4 and 5 of network 11. The color signals are amplified individually by amplifiers within a kinescope driver stage 25 to provide high level output color signals R, G and B to respective intensity control electrodes of a color image reproducing kinescope 28.

Detected video signals from unit 10 are also supplied to a sync separator 33 for deriving the horizontal line synchronizing (sync) component of the television signal. The derived sync component is supplied from an output of sync separator 33 to sync processing and deflection circuits 38. Circuits 38 provide horizontal and vertical deflection signals for application to deflection control circuits of receiver kinescope 28, and vertical and horizontal blanking timing signals.

A composite timing signal generator 35 responds to output signals from sync separator 33, to horizontal and vertical blanking timing signals from deflection circuits 38, and to control signals $S_c$ and $S_p$ from unit 10. A composite ("sandcastle") timing signal output from generator 35 is supplied via a terminal 6 to a signal decoder 40, which decodes the composite timing signal into separate signals $V_B$, $V_C$, $V_K$ and $V_H$, $V_V$ as required by keyed signal processing circuits within network 11. Decoder 40 is shown in detail in copending U.S. patent application Ser. No. 113,371 of R. L. Shanley, II, et al., titled "Controlled Output Composite Keying Signal Generator For A Television Receiver."

Signals $V_B$ and $V_C$ encompass the burst interval and exhibit a mutually antiphase (push-pull) relationship, and are applied to keying inputs of chroma-burst separator 15. Signal $V_K$ is in-phase with and of the same (positive) polarity as signal $V_B$, and is applied to a keying input of comparator 30. Plural signals $V_H$, $V_V$ respectively occur during each horizontal and vertical image blanking interval and are applied to respective plural keying inputs of output stage 25.

In the arrangement of FIG. 1, the blocks within network 11 are largely capable of being fabricated as a single integrated circuit. In such case, terminals 1-6 correspond to external connecting terminals of the integrated circuit.

Figure 2:
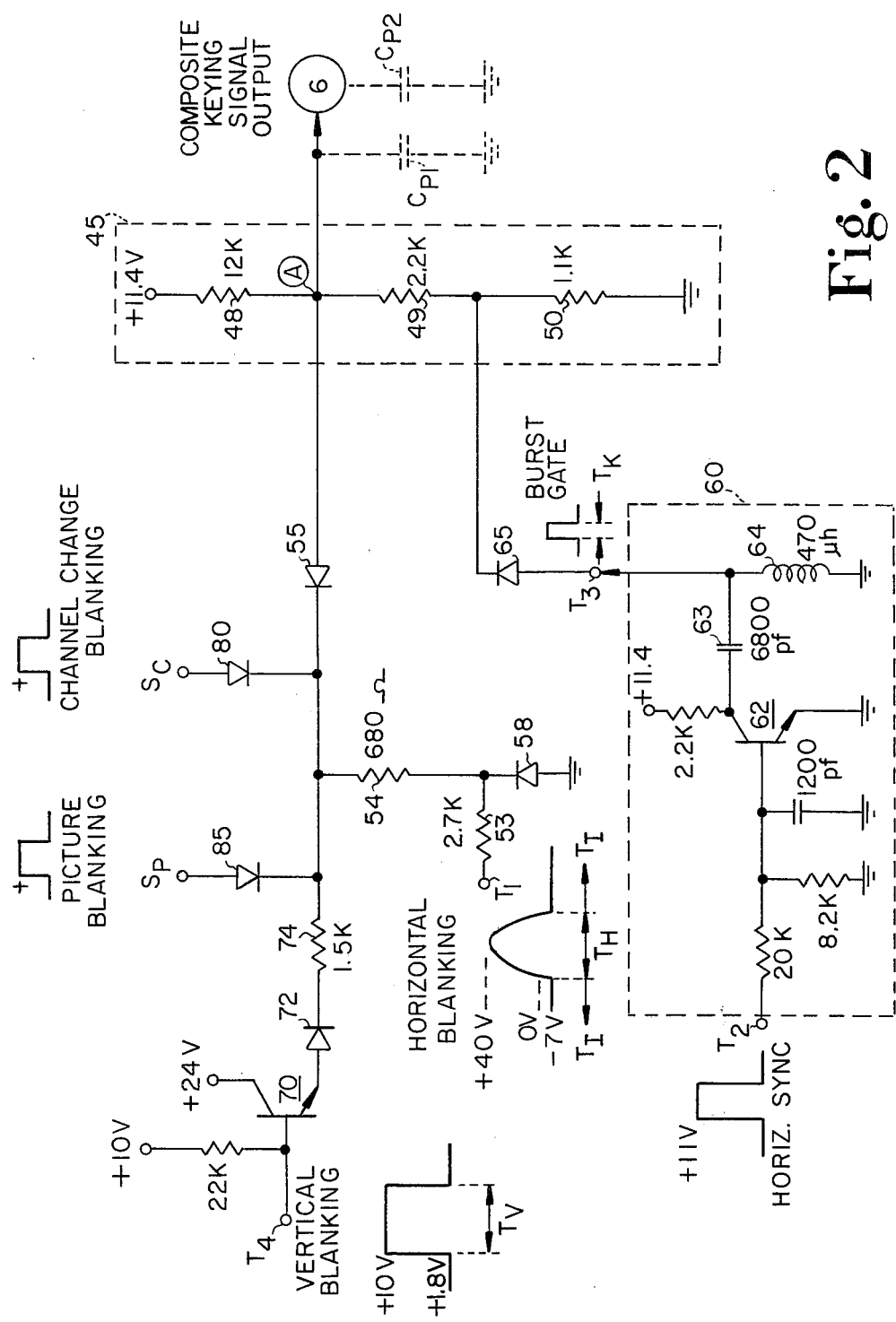
FIG. 2 illustrates a circuit diagram of timing signal generator apparatus according to the present invention.

FIG. 2 shows a circuit arrangement of composite timing signal generator 35 in FIG. 1. The output of signal generator circuit 35 includes a resistor voltage divider 45 comprising series resistors 48, 49 and 50 coupled between a source of regulated D.C. voltage (+11.4 volts) and a reference potential (ground). A composite timing signal output from circuit 35 is developed at a point A in voltage divider 45.

Horizontal blanking timing signals from deflection circuits 38 (FIG. 1) are applied to a terminal $T_1$ of circuit 35. The horizontal timing signal comprises a positive horizontal flyback pulse blanking component which occurs during each horizontal line blanking interval $T_H$, and a negative component which occurs during each horizontal line image (picture) interval $T_I$. The positive flyback pulse is coupled via resistors 53 and 54 to a diode 55, which is rendered non-conductive (reverse biased) by the flyback pulse. A diode 58 is also rendered non-conductive in response to the positive flyback pulse during horizontal blanking intervals $T_H$. With diode 55 being non-conductive during the horizontal blanking intervals, a voltage level then appearing at output point A of voltage divider 45 is determined solely by the voltage divider action of resistors 48, 49 and 50. This voltage level corresponds to the blanking pedestal level associated with the first pulse component of the composite timing signal generated by circuit 35.

The second pulse component of the composite timing signal is developed by a network 60 including a normally non-conductive switching transistor 62. Transistor 62 is keyed to conduct in response to positive horizontal sync pulses supplied from sync separator 33 (FIG. 1) to a terminal $T_2$ of network 60. Network 60 develops a positive output burst gate pulse at a terminal $T_3$, as described in detail in U.S. Pat. No. 4,051,518—Sendelweck. The burst gate pulse occurs over an interval $T_K$ within horizontal retrace interval $T_H$, and encompasses the color reference burst interval of the color television signal. A resonant circuit including a capacitor 63 and an inductor 64 in the collector circuit of transistor 62 assist to determine the timing of the burst gate pulse. The output gate pulse from network 60 is coupled via a diode 65 to voltage divider 45, where the gate pulse is combined with the first (blanking) pulse component to form the composite timing signal at point A and terminal 6.

Figure 3:
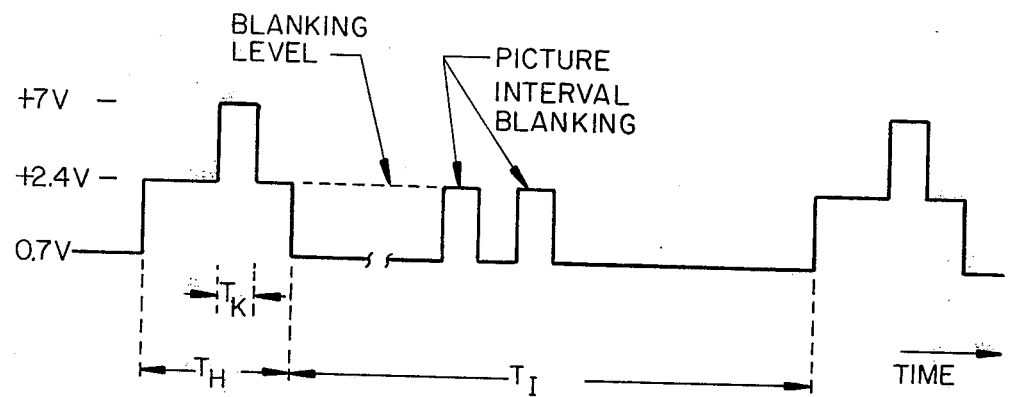
FIG. 3 depicts a signal waveform useful in understanding the operation of the timing signal generator shown in FIG. 2.

Thus, as seen from the signal waveform of FIG. 3, the composite output timing signal developed by the circuit of FIG. 2 for horizontal timing purposes includes first and second pulse components. During each horizontal retrace blanking interval $T_H$, the first (lower) pulse component with a blanking pedestal level of +2.4 volts in this example is produced in response to the horizontal flyback pulse during interval $T_H$, although the +2.4 volt blanking level is not directly determined by the level of the flyback pulse. The amplitude of the flyback pulse is not critical, and need only be sufficient to reverse bias diode 55 during interval $T_H$. The burst gate pulse from network 60 constitutes the second (upper) pulse component of the composite timing signal, and is superimposed on the first pulse component during interval $T_K$.

Analogous observations pertain with respect to generating a composite vertical rate timing signal during vertical blanking interval $T_V$. During each vertical retrace blanking interval $T_V$, a positive-going vertical blanking pulse is applied to a terminal $T_4$. This pulse is coupled via a follower transistor 70, a diode 72 and a resistor 74 to diode 55, which is rendered non-conductive in response to the vertical blanking pulse. Diodes 58, 80 and 85 are also rendered non-conductive at this time. Accordingly, as in the case of horizontal blanking, the desired vertical blanking level then developed at point A is solely a function of the voltage divider action of resistors 48, 49 and 50. Waveforms of composite timing signals developed for horizontal and vertical purposes are shown in detail in the aforementioned U.S. patent application Ser. No. 113,370 of R. L. Shanley.

The circuit of FIG. 2 also includes provision for developing an output blanking level during channel change blanking intervals when the receiver is being tuned from one channel to the next, and during picture intervals. Channel change blanking is desirable since it serves to eliminate visual interference (e.g., disturbing flashes, streaks and other forms of transient interference) which would normally occur during tuning of the receiver and which would be displayed by the kinescope of the receiver. Provision for picture interval blanking is required in a receiver intended to display alphanumeric information (e.g., time and channel information) as well as normal picture information. In such a receiver a portion of the video image is blanked to provide a black or dark background on the kinescope display screen, and an auxiliary video signal representative of the alphanumeric information is substituted for the blanked video signal image information. In practice, the dark background display area is slightly greater than the superimposed alphanumeric display area, to provide a "black surround" outline sufficient to highlight the alphanumerics information.

Channel change blanking is provided in response to positive pulse control signal $S_c$ supplied from unit 10 (FIG. 1) to diode 55 via diode 80, and picture interval blanking is provided in response to positive pulse control signal $S_p$ supplied from unit 10 to diode 55 via diode 85. Signals $S_c$ and $S_p$ serve to reverse bias diode 55 so that a blanking level is produced at point A of voltage divider 45 solely in accordance with the voltage divider action of resistors 48, 49 and 50. Picture interval blanking signals produced in this manner are shown in FIG. 3.

During each horizontal image interval $T_I$, in the absence of channel change blanking or picture interval blanking, the negative component ($-7$ volts) of the horizontal timing signal causes an unblanking voltage level of approximately $+0.7$ volts to be developed at output point A of voltage divider 45, by causing clamping diode 58 and switching diode 55 to be rendered conductive. The $+0.7$ volt unblanking output level is determined by the offset voltage developed across conductive diodes 55 and 58, together with a voltage drop then developed across resistor 54. The unblanking level serves to assure that false gate pulses from network 60 (such as may be developed in response to spurious signals such as noise) do not appear at point A. Otherwise, false gate pulses if permitted to appear at point A would be decoded by decoder 40 (FIG. 1), causing improper picture interval keying of the keyed video signal processing circuits. The presence of false gate pulses from network 60 causes the output unblanking level to increase slightly above the $+0.7$ volt level due to the current associated with the false gate pulses which causes the voltage drop across resistor 54 to increase slightly. However, the slightly increased unblanking level is nevertheless sufficient to assure that false gate pulses do not appear at point A during picture intervals.

The clamping action of diode 58 serves to assure that the desired unblanking level during picture intervals is not disturbed by "ringing" associated with the lagging edge of the horizontal flyback pulse component, at the end of blanking interval $T_H$. If picture interval blanking signal $S_p$ or channel change blanking signal $S_c$ are developed during picture intervals, diodes 85 or 80 will be rendered conductive, causing diodes 55, 58 and 72 to be rendered non-conductive so that the desired blanking level is developed at point A by means of voltage divider 45 as discussed previously. Thus the unblanking output voltage is normally developed at times except during the horizontal, vertical, channel change, and picture interval blanking times.

The circuit of FIG. 2 as so far discussed is advantageous since the magnitude of the blanking signal developed at output point A and terminal 6 is predictably established solely as a function of the voltage divider action of resistors 48, 49 and 50. During blanking intervals, the output blanking level is insensitive to unit-to-unit tolerance induced variations in the component values of the other circuit components, since voltage divider 45 is isolated from other parts of the circuit during the blanking intervals. The output blanking level is also substantially insensitive to amplitude variations of the input signals including control signals $S_p$, $S_c$ and the horizontal and vertical timing signals. The amplitudes of these signals are not critical and need not be controlled carefully. It is only necessary that the amplitudes of these signals be sufficient to decouple voltage divider 45 from the remainder of the circuit during the blanking intervals such as by rendering diode 55 non-conductive at such times.

With the described arrangement, the output blanking level is predictably established at the same, desired level for horizontal retract blanking, vertical retrace blanking, picture interval blanking, and channel change blanking. The predictably established output blanking level also enhances the amplitude predictability of the second (upper) keying pulse component of the composite timing signal, since this pulse component is developed on a pedestal formed by the output blanking level.

The predictability of the output blanking level is further enhanced when voltage divider 45 is fabricated in an integrated circuit, since the output blanking level is a function of the ratio among resistors 48, 49 and 50, which can be established with a high degree of accuracy in an integrated circuit.

It was previously mentioned that the circuit of FIG. 2 includes provision for blanking a portion of the normal video signal during image intervals, for the purpose of permitting the display of auxiliary alphanumerics information. In this regard, it is noted that the edge detail of the alphanumerics display can be distorted by a vertical edge "smearing" effect caused by a slow blanking response time between the end of the normal video signal picture information and the beginning of the alphanumerics blanking interval. In the arrangement of FIG. 2, for example, a slow blanking response time sufficient to cause edge "smear" can result from the effects of a parasitic capacitance $C_{p1}$ associated with the wiring connection between output point A and terminal 6 (e.g., on the order of five picofarads), and from the effects of a parasitic capacitance $C_{p2}$ associated with terminal 6 (e.g., on the order of five picofarads), if these parasitic capacitances are not compensated for.

The circuit of FIG. 2 is arranged to effectively eliminate the blanking delay and associated edge smear which would otherwise exist. Specifically, the values of resistors 48-50 of voltage divider 45 are chosen so that the effective output impedance of voltage divider 45 at output point A is low enough (approximately 2.6 kilohms) to develop a blanking time constant, together with the values of the parasitic capacitances, which is sufficient to permit rapid charging of the parasitic capacitances at the onset of the alphanumerics blanking interval so that the desired blanking level ($+2.4$ volts in this example) is attained quickly. In this example, the output time constant is approximately twenty-six nanoseconds, which is fast compared to the lower limit of normally expected response times of video signal amplitude transitions (e.g., approximately fifty nanoseconds).

What is claimed is:

1. In a television receiver for processing a composite television signal including image and blanking intervals, said receiver including means for providing a plurality of image blanking signals each with a blanking pulse component occurring during image blanking intervals, said plurality of blanking signals including horizontal and vertical blanking signals; and keyed signal processing circuits; apparatus for generating a timing signal during said blanking intervals, said apparatus comprising:

resistive impedance voltage divider means coupled across a source of D.C. potential during said television signal image and blanking intervals and including an output terminal coupled to said keyed signal processing circuits, said voltage divider means being arranged with respect to said D.C. potential for producing a voltage divided version of said D.C. potential corresponding to a desired blanking voltage level;

controlled switching means coupled to said voltage divider means and operable between first and second conductive states; and means for coupling said plurality of blanking signals to said switching means for (a) causing said switching means to exhibit said first conductive state for decoupling said coupling means from said voltage divider means in response to said blanking pulse components, so that said voltage divider means is then permitted to produce said desired blanking voltage level at said output terminal, and (b) causing said switching means to exhibit said second conductive state in the absence of said pulse components, so that a voltage level different than said desired blanking level is produced at said output terminal.

2. Apparatus according to claim 1 in a television receiver for processing a color television signal including a color burst component occurring during a burst interval within horizontal image blanking intervals, said receiver also including means for providing a horizontal reference pulse subject to synchronization by synchronizing information included in said television signal, said apparatus further comprising:

keyed means responsive to said horizontal reference pulse for producing a gate pulse encompassing said burst interval; and means for combining said gate pulse with said blanking voltage level to produce a composite timing signal at said output terminal comprising said gate pulse superimposed on said blanking voltage level.

3. Apparatus according to claim 2, wherein said plurality of image blanking signals comprises:

a control signal including a blanking pulse component occurring during channel changing intervals, when said receiver is being tuned from one channel to another.

4. Apparatus according to claim 2, wherein said plurality of image blanking signals comprises:

a control signal including a blanking pulse component occurring during horizontal image intervals when an auxiliary video signal exclusive of said composite television signal is to be processed by said receiver.

5. Apparatus according to claim 4, wherein:

said output terminal of said voltage divider means is coupled to said keyed signal processing circuits via a coupling path including a parasitic capacitance; and said voltage divider means exhibits an output impedance of a magnitude such that a time constant determined by said output impedance and the value of said parasitic capacitance is fast relative to normally expected response times of video signal amplitude transitions.

6. Apparatus according to claim 1, wherein:

said blanking signal providing means includes a first blanking signal source developing an alternating current horizontal blanking signal including horizontal blanking pulse components of a first polarity;

said switching means comprises a first diode having first and second electrodes, with said first electrode being connected to said voltage divider means;

said coupling means comprises a direct current conductive impedance and a second diode coupled across said first blanking signal source, said second diode being poled such that said second diode is rendered non-conductive during periods of development of said horizontal blanking pulse components of said first polarity; and wherein means are included for direct current conductively connecting the junction of said impedance and said second diode to said second electrode of said first diode, with said first diode being poled such that said connecting means links like electrodes of said first and second diodes.

7. Apparatus according to claim 6, wherein:

said blanking signal providing means includes a second blanking signal source developing a vertical blanking signal including vertical blanking pulse components of said first polarity at an output terminal thereof; and said coupling means further includes a third diode, and means for direct current conductively connecting said third diode between said output terminal of said second blanking signal source and said second electrode of said first diode, said third diode being poled such that said third diode is rendered conductive during appearances of said vertical blanking pulse components at said output terminal of said second blanking signal source.

8. Apparatus according to claim 7, wherein:

said means for connecting said third diode includes a transistor arranged as an emitter follower with a base-emitter path interposed between said output terminal of said second blanking signal source and said third diode, said base-emitter path being poled for forward conduction during appearances of said vertical blanking pulse components at said output terminal of said second blanking signal source.

9. In a television receiver for processing a composite television signal including image and blanking intervals, said receiver including means for providing a plurality of image blanking signals each with a blanking pulse component occurring during image blanking intervals, said plurality of blanking signals including horizontal and vertical blanking signals; and keyed signal processing circuits; apparatus for generating a timing signal during said blanking intervals, said apparatus comprising:

passive voltage divider means consisting of a plurality of resistors coupled across a source of D.C. potential during said television signal image and blanking intervals and including an output terminal coupled to said keyed signal processing circuits, said voltage divider means being arranged with respect to said D.C. potential for producing a voltage divided version of said D.C. potential corresponding to a desired blanking voltage level;

controlled switching means coupled to said voltage divider means and operable between first and second conductive states; and means for coupling said plurality of blanking signals to said switching means for (a) causing said switching means to exhibit said first conductive state for decoupling said coupling means from said voltage divider means in response to said blanking pulse components, so that said voltage divider means is then permitted to produce said desired blanking voltage level at said output terminal, and (b) causing said switching means to exhibit said second conductive state in the absence of said pulse components, so that a voltage level different than said desired blanking level is produced at said output terminal.

* * * * *